United States Patent
Riedel et al.

(10) Patent No.: US 9,429,957 B2
(45) Date of Patent: Aug. 30, 2016

(54) VARIABLE CAPACITY FUEL TANK

(75) Inventors: Paulo A. Riedel, Rochester Hills, MI (US); Luiz H. Riedel, Indaiatuba (BR)

(73) Assignee: GM Global Technology Operations LLC, Detroit, MI (US)

( * ) Notice: Subject to any disclaimer, the term of this patent is extended or adjusted under 35 U.S.C. 154(b) by 1208 days.

(21) Appl. No.: 12/399,093

(22) Filed: Mar. 6, 2009

(65) Prior Publication Data

US 2010/0224263 A1 Sep. 9, 2010

(51) Int. Cl.
*G05D 9/12* (2006.01)

(52) U.S. Cl.
CPC .............. *G05D 9/12* (2013.01); *Y10T 137/27* (2015.04)

(58) Field of Classification Search
CPC ....... G05D 11/00; G05D 9/12; Y10T 137/27
USPC ....... 137/87.02, 588, 587, 101.25, 558, 393, 137/78.1
See application file for complete search history.

(56) References Cited

U.S. PATENT DOCUMENTS

| | | | |
|---|---|---|---|
| 4,444,333 A * | 4/1984 | Anhegger | 137/587 |
| 4,958,655 A | 9/1990 | Danek | |
| 5,373,957 A * | 12/1994 | Gryc | 137/587 |
| 6,732,759 B2 * | 5/2004 | Romanek et al. | 137/588 |
| 6,854,492 B2 * | 2/2005 | Benjey | 137/588 |
| 7,665,447 B2 * | 2/2010 | Shinagawa et al. | 123/516 |
| 2003/0140970 A1 * | 7/2003 | Benjey | 137/587 |
| 2006/0000508 A1 * | 1/2006 | Delaire et al. | 137/247.35 |
| 2006/0070656 A1 * | 4/2006 | Crawford | 137/202 |
| 2007/0186976 A1 * | 8/2007 | Hilderley et al. | 137/202 |
| 2009/0303466 A1 * | 12/2009 | Arakawa et al. | 356/128 |

OTHER PUBLICATIONS http://physics.info/density/, The Physics Hypertextbook, Glenn Elert, 1998-2014, pp. 1-3.*
http://people.rit.edu/vjrnts/courses/matter/labs/buoyancy/buoyancy.lab.html, Processes of Science: Physics of Matter, Archimedes' Principle and Buoyancy, Lab #5, pp. 1-8.*

* cited by examiner

*Primary Examiner* — Arthur O Hall
*Assistant Examiner* — Chee-Chong Lee
(74) *Attorney, Agent, or Firm* — Quinn Law Group, PLLC

(57) ABSTRACT

A fuel tank assembly is fillable by a fuel pump. The fuel pump is configured such that the existence of a predetermined condition causes the pump to stop delivering fuel. The fuel tank assembly includes a tank defining a chamber, a fill tube, and a fuel pump shut-off system. The fill tube defines an opening configured to receive a nozzle of the pump, and a passageway that provides fluid communication between the opening and the chamber to transfer liquid fuel from the nozzle to the chamber. The fuel pump shut-off system is configured to selectively generate the predetermined condition, and is configured such that whether the predetermined condition exists depends on the total volume of liquid fuel in the chamber and the chemical composition of the liquid fuel in the chamber.

20 Claims, 1 Drawing Sheet

VARIABLE CAPACITY FUEL TANK

TECHNICAL FIELD

This invention relates to vehicular fuel tank assemblies.

BACKGROUND OF THE INVENTION

A typical automotive vehicle having a spark ignition engine uses gasoline fuel. The vehicle includes an onboard fuel tank that defines a chamber in which the gasoline fuel is stored for use by the engine. The onboard fuel tank is refillable by offboard fuel pumps, such as the ones found at commercial gas stations.

A typical automotive onboard fuel tank is configured to cause an offboard pump to automatically stop delivering fuel to the tank when a predetermined volume of fuel is in the tank chamber. The predetermined volume is less than the volumetric capacity of the tank chamber. The remaining volume in the tank chamber is necessary to accommodate vapors that form from the liquid gasoline fuel in the tank.

SUMMARY OF THE INVENTION

A fuel tank assembly for an automotive vehicle is provided. The fuel tank assembly is fillable by a pump that is configured to automatically stop delivering fuel when a predetermined condition exists. The fuel tank assembly includes a tank and a fill tube. The tank defines a chamber for storing liquid fuel. The fill tube defines an opening configured to receive a nozzle of the pump. The fill tube also defines a passageway that provides fluid communication between the opening and the chamber. Accordingly, the fill tube is configured to transfer liquid fuel from the nozzle to the chamber.

The fuel tank assembly also includes a fuel pump shut-off system. The fuel pump shut-off system is configured to selectively generate the predetermined condition that causes the pump to automatically stop delivering fuel. The fuel pump shut-off system is configured such that whether the predetermined condition exists depends on the volume of liquid fuel in the chamber and the chemical composition of the liquid fuel in the chamber. Accordingly, the tank assembly enables the maximum fill level of liquid fuel in the tank to vary with different fuel compositions.

For example, alcohol has a lower vapor pressure than gasoline, and therefore requires less expansion volume in the tank. In a vehicle configured to be operable with fuel blends of differing ratios of alcohol to gasoline, the fuel pump shut-off system may be configured such that the maximum fill level of the tank increases with increasing alcohol content of the fuel in the tank, thereby enabling a greater vehicle driving range with alcohol fuel than prior art tank assemblies.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
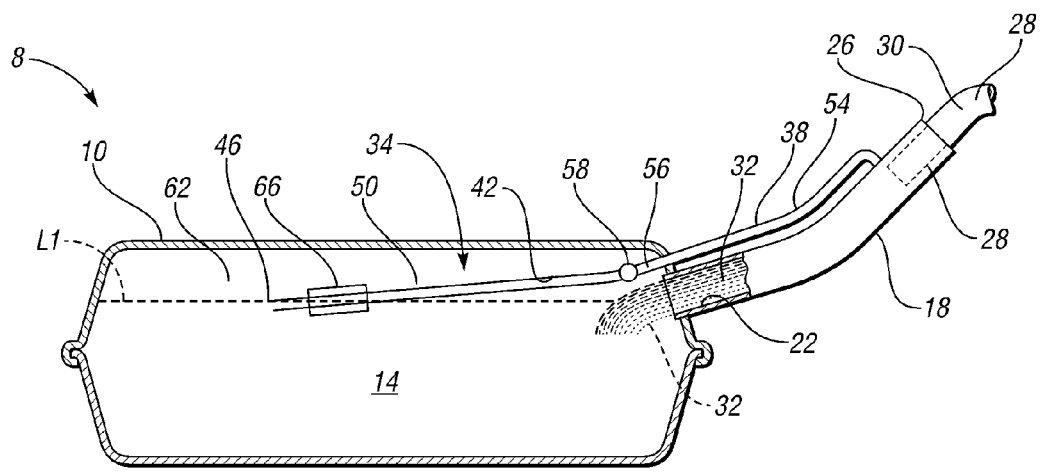
FIG. 1 is a schematic, partially cut-away, side view of a fuel tank assembly including a fuel pump shut-off system in a first position.

Referring to FIG. 1, a vehicular fuel tank assembly 8 includes a fuel tank 10. The tank 10 defines a chamber 14. The tank 10 in the embodiment depicted is mounted with respect to the chassis (not shown) of a vehicle and is configured to store fuel for use by the vehicle's engine (not shown). An onboard fuel pump (not shown) draws fuel from the chamber 14 and delivers the fuel to the engine, as understood by those skilled in the art.

The fuel tank assembly 8 includes a filler tube 18 that is operatively connected to the tank 10. The filler tube 18 defines a passage 22 having an opening 26 at one end of the filler tube 18. The passage 22 provides fluid communication between the opening 26 and the chamber 14. A nozzle 28 of an offboard pump assembly 30 is insertable into the passage 22 via the opening 26, as shown in FIG. 1. The offboard pump assembly 30 is configured to deliver liquid fuel 32 via the nozzle 28, as understood by those skilled in the art. When the nozzle 28 is inserted through the opening 26 and the offboard pump assembly 30 is delivering fuel into the passage 22 via nozzle 28, the filler tube 18 transfers the liquid fuel 32 from the nozzle 28 to the chamber 14.

The fuel tank assembly 8 also includes a vent system 34. The vent system 34 includes a vent tube 38, which defines a passage 42. The vent tube 38 also defines an inlet 46 for the passage 42. The inlet 46 is disposed within the chamber 14 of the tank 10. The passage 42 provides fluid communication between the chamber 14 and the exterior of the tank 10. More specifically, in the embodiment depicted, the vent tube 38 is operatively connected to the fill tube 18 so that passage 42 is in fluid communication with passage 22. Other configurations of the vent system 34 that provide fluid communication between the exterior of the tank 10 and the chamber 14 may be employed within the scope of the claimed invention. For example, the vent tube may provide fluid communication between the chamber 14 and a vapor canister (not shown), the vent tube may provide fluid communication directly between the chamber 14 and the atmosphere, etc.

The vent tube 38 includes a first segment 50 and a second segment 54. The first segment 50 is within the chamber 14 and defines the inlet 46. The second segment 54 is connected to the filler tube 18. The first and second segments 50, 54 are substantially rigid. A flexible tube segment 56 interconnects the first segment 50 and the second segment 54 such that the first segment 50 is selectively rotatable with respect to the second segment 54.

Figure 2:
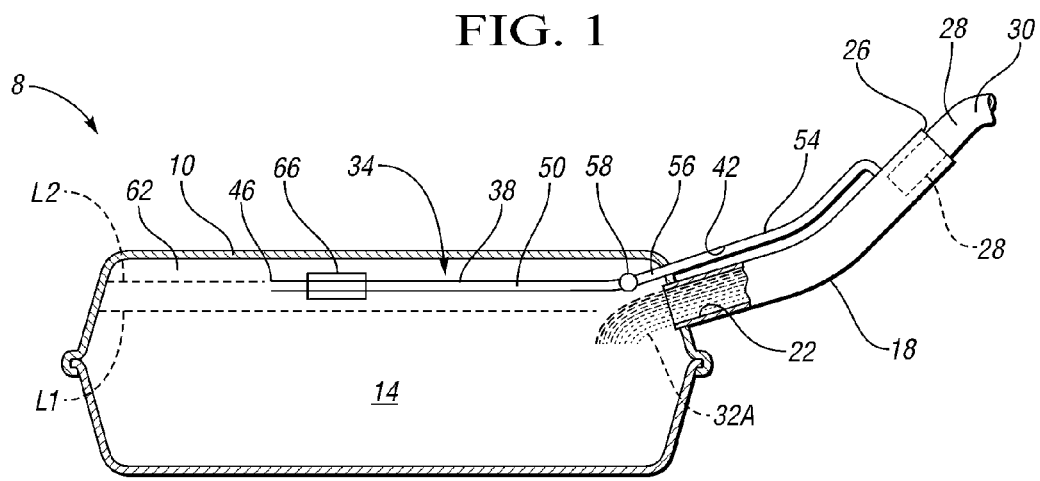
FIG. 2 is a schematic, partially cut-away, side view of the fuel tank assembly of FIG. 1 with the fuel pump shut-off system in a second position.

A pivot 58 is mounted with respect to the tank 10 inside the chamber 14. The pivot 58 rotatably supports the first segment 50. More specifically, the pivot 58 is configured such that the first segment 50 is rotatable between a first position, as shown in FIG. 1, and a second position, as shown in FIG. 2. The pivot 58 is configured to limit rotation of the first segment 50 to a predetermined range, which has the first and second positions as its limits. Thus, the first segment 50 is not rotatable counterclockwise (as viewed in FIGS. 1 and 2) from its first position. Similarly, the first segment 50 is not rotatable clockwise (as viewed in FIGS. 1 and 2) from its second position.

The inlet 46 is positioned such that the inlet 46 moves vertically as the first segment 50 rotates about the pivot 58 between the first and second positions. That is, the height of the inlet 46 is greater when the first segment 50 is in the second position, as shown in FIG. 2, than when the first segment 50 is in the first position, as shown in FIG. 1. The default position of the first segment 50 is its first position. That is, the first segment 50 is biased in its first position. In the embodiment depicted, gravity biases the first segment 50 in its first position. Alternatively, a spring (not shown) may bias the first segment 50 in its first position.

The chamber 14 contains gasses 62, namely, air and fuel vapor, as understood by those skilled in the art. The vent system 34 selectively permits the gasses 62 in the chamber 14 to exit the chamber 14 as the gases 62 are displaced by liquid fuel 32 entering the chamber 14 from passage 22. More specifically, as liquid fuel 32 enters the chamber 14 from passage 22, the liquid fuel 32 displaces the gasses 62, which are forced through the inlet 46 and through passage 42 to the filler tube 18.

The pump assembly 30 is responsive to the existence of a predetermined condition by automatically stopping the flow of liquid fuel 32 through the nozzle 28 and into the chamber 14. That is, the pump assembly 30 is configured to automatically stop the flow of liquid fuel 32 from the nozzle 28 and into the filler tube 18 when a predetermined condition exists. In the embodiment depicted, the predetermined condition is obstruction of the passage 42 sufficient to prevent the passage of gasses 62 from the chamber 14 through the passage 42. More specifically, the pump assembly 30 detects a change in the pressure characteristics of the chamber 14 caused by the obstruction of the passage 42, such as by sensing liquid fuel 32 backing up the filler pipe 18, and responds by terminating the flow of fuel 32 from the nozzle 28, as understood by those skilled in the art. The vent system 34 in the embodiment depicted is thus a fuel pump shut-off system.

In the embodiment depicted, the passage 42 is sufficiently obstructed to prevent the passage of gasses 62 from the chamber 14 when the inlet 46 is submerged by liquid fuel 32. Thus, the height of the inlet 46 determines the volume of liquid fuel 32 that can be added to the tank 10. The vent system 34 is configured such that the height of the inlet 46, and thus the maximum volume of liquid fuel 32 in the chamber 14 of the tank 10, depends upon the chemical composition of the liquid fuel 32 in the chamber 14.

The vent system 34 includes a sensor that is configured to sense a characteristic of the liquid fuel 32 that is indicative of the chemical composition of the liquid fuel 32. The vehicle in which the fuel tank assembly 8 is installed is operable with fuel blends having differering ratios of alcohol (ethanol) to gasoline. The density of ethanol is greater than the density of gasoline, and thus density is a characteristic of the liquid fuel 32 that is indicative of the chemical composition of the liquid fuel 32.

In the embodiment depicted, the sensor is a floater 66 disposed within the chamber 14 and operatively connected to the first segment 50 of the vent tube 38 such that vertical movement of the floater 66 causes vertical movement of the first segment 50 and, correspondingly, the inlet 46. The floater 66 senses the density of the liquid fuel 32 in the tank. More specifically, the floater 66 is positioned within the chamber 14 such that, as liquid fuel 32 accumulates in the chamber 14, the accumulated liquid fuel 32 eventually rises to a height, or level, within the chamber 14 at which the liquid fuel 32 contacts the floater 66.

Referring specifically to FIG. 1, liquid fuel 32 is a fuel blend known as "E-20," which is eighty percent gasoline and twenty percent ethanol. The density of the floater 66 is such that the floater 66 does not exhibit buoyancy in E-20. Accordingly, the position of the floater 66, and therefore the position of the first segment 50 and the inlet 46, is unaffected by the rise of liquid fuel 32, and the first segment 50 remains in its first position. The inlet 46 is submerged when the volume of the liquid fuel 32 is such that the liquid fuel 32 reaches level L1 in the chamber 14. Thus, the pump assembly 30 terminates the flow of liquid fuel 32 when the level of the liquid fuel 32 in the chamber 14 reaches level L1. The volume of the chamber 14 above level L1 accommodates the vapors that form from the gasoline in liquid fuel 32. In an exemplary embodiment, the volume of the chamber 14 above level L1 is between ten and fifteen percent of the total volume of the chamber 14.

Referring to FIG. 2, liquid fuel 32A is a fuel blend known as "E-100," which is one hundred percent ethanol. As liquid fuel 32A accumulates in the chamber 14, the accumulated liquid fuel 32A eventually rises to a height, or level, within the chamber 14 at which the liquid fuel 32A contacts the floater 66. The density of the floater 66 is such that the floater 66 exhibits buoyancy in E-100. That is, as the level of the accumulated liquid fuel 32A in the chamber 14 rises, the floater 66 rises. The upward movement of the floater 66 causes the rotation of the first segment 50 from its first position to its second position, as shown in FIG. 2. The inlet 46 is higher when the first segment 50 is in its second position than when the first segment 50 is in its first position. The inlet 46 is submerged when the volume of the liquid fuel 32A is such that the liquid fuel 32 reaches level L2 in the chamber 14. Thus, the pump assembly 30 terminates the flow of liquid fuel 32A when the level of the liquid fuel 32A in the chamber 14 reaches level L2. Level L2 is higher than level L1, and thus the tank assembly 8 permits a greater volume of liquid fuel 32A than liquid fuel 32 to accumulate in the chamber 14.

In an exemplary embodiment, the volume of the chamber 14 above level L2 is between five and ten percent of the total volume of the chamber 14. Less expansion volume is necessary for fuel 32A than for fuel 32 because fuel 32A has a lower vapor pressure than fuel 32. Levels L1 and L2 are exemplary. Those skilled in the art will recognize that the desired range and positions of the inlet 46 may be affected by the shape of the chamber 14, the expected range of chemical compositions of fuel used, etc.

Figure 3:
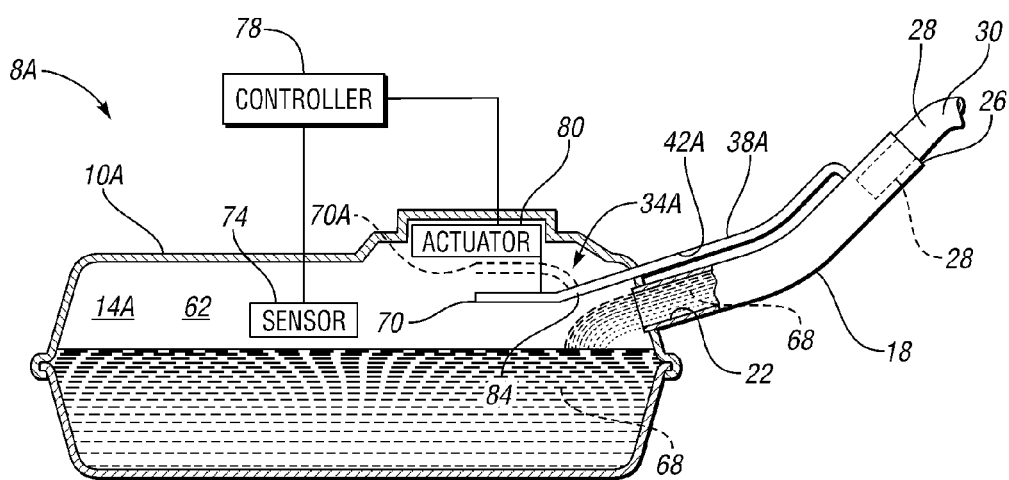
FIG. 3 is a schematic, partially cut-away, side view of an alternative fuel tank assembly in accordance with the claimed invention.

Referring to FIG. 3, wherein like reference numbers refer to like components from FIGS. 1 and 2, an alternative tank assembly 8A configuration is schematically depicted. The tank assembly 8A includes a tank 10A that defines a chamber 14A. The fuel tank assembly 8A includes a filler tube 18 that is operatively connected to the tank 10A. The filler tube 18 defines a passage 22 having an opening 26 at one end of the filler tube 18. The passage 22 provides fluid communication between the opening 26 and the chamber 14A. The nozzle 28 of the offboad pump assembly 30 is insertable into the passage 22 via the opening 26, as shown in FIG. 3, for delivering liquid fuel 68 to the chamber 14A via passage 22.

The fuel tank assembly 8A also includes a vent system 34A. The vent system 34A includes a vent tube 38A, which defines a passage 42A. The vent tube 38A also defines an inlet 70 for the passage 42A. The inlet 70 is disposed within the chamber 14A of the tank 10A. The passage 42A provides fluid communication between the chamber 14A and the exterior of the tank 10A. More specifically, in the embodiment depicted, the vent tube 38A is operatively connected to the fill tube 18 so that passage 42A is in fluid communication with passage 22.

The vent system 34A is part of a fuel pump shut-off system, which also includes a sensor 74, a controller 78, and an actuator 80. The liquid fuel 68 is characterized by a material property, the value of which is indicative of the chemical composition of the liquid fuel 68. The sensor 74 is mounted with respect to the tank 10A and is configured to measure the value of the material property of the liquid fuel 68 that has accumulated in the chamber 14. The sensor 74 is operatively connected to the controller 78 and is configured to transmit a signal that is indicative of the value of the material property to the controller 78. Exemplary material properties indicative of chemical composition and measured by the sensor 74 include, for example, density, dielectric constant, specific conductivity, optical refractive index, oxygen content, etc.

The actuator 80 is operatively connected to the vent tube 38A and is configured to selectively move one end of the vent tube 38A such that the height of the inlet 70 is selectively variable. More specifically, the actuator 80 is configured to selectively move the inlet between a first, lowered position shown at 70, and a second, elevated position shown in phantom at 70A. In the embodiment depicted, at least part 84 of the vent tube 38A is flexible to accommodate the movement of the inlet 70. Other configurations of the vent tube 38A that accommodate vertical movement of the inlet 70 may be employed within the scope of the claimed invention.

The controller 78 is operatively connected to the actuator 80 such that the controller 78 controls the actuator 80 and the vertical position, or height, of the inlet 70. More specifically, the controller 78 is programmed and configured to control the actuator 80 such that the height of the inlet 70 is determined by the value of the material property as measured by the sensor 74.

In the embodiment depicted, the controller 78 is configured to control the actuator 80 such that the height of the inlet 70 increases with increasing ethanol content of the liquid fuel 68 in the chamber 14A. The controller 78 is configured to cause the inlet 70 to be in its lowered position if the value of the material property of the liquid fuel 68, as communicated by the sensor 74, is indicative of the fuel 68 being E-20 or pure gasoline. The controller 78 is configured to cause the inlet 70 to be in its elevated position, as shown in phantom at 70A, if the value of the material property of the liquid fuel 68, as communicated by the sensor 74, is indicative of the liquid fuel 68 being E-100. Values of the liquid fuel 68 indicating ethanol content between twenty percent and one hundred percent will cause the inlet 70 to be between the lowered and elevated positions, with the height of the inlet 70 increasing proportionally with increasing ethanol content of the liquid fuel 68.

Since the height of the inlet 70 determines the volume of liquid fuel 68 that can be added to the tank 10A, and since the vent system 34A is configured such that the height of the inlet 70 depends upon the chemical composition of the liquid fuel 68 in the chamber 14A, the volume of liquid fuel 68 that is added to the tank 10A prior to the pump assembly 30 terminating fuel delivery is dependent upon the chemical composition of the liquid fuel 68 in the chamber 14A.

Those skilled in the art will recognize that the desired range and positions of the inlet 70 may be affected by the shape of the chamber 14A, the expected range of chemical compositions of fuel used, etc. For example, in the embodiment depicted, it may be desirable for the lowered and elevated positions of the inlet 70 to be higher than shown in FIG. 3. A portion of the vent tube 38A inside the chamber 14A is shown horizontally oriented in FIG. 3. However, it should be noted that other orientations or configurations may be desirable, depending on the shape of the chamber 14A. For example, and within the scope of the claimed invention, the vent tube 38A may be routed into the tank 10A through the upper surface of the tank 10A above the actuator 80 so that the portion of the vent tube 38A inside the chamber 14A is vertically oriented and the inlet 70 faces downward.

It should be noted that other mechanisms and techniques of obstructing the passage 42A may be employed within the scope of the claimed invention. For example, the vent tube 38A may be stationary and include a valve (not shown) that obstructs the passage 42A when closed and permits fluid communication through the passage 42A when open. In such an embodiment, the actuator 80 would be configured to selectively move the valve between the open and closed positions.

In the embodiments of FIGS. 1-3, the predetermined condition that automatically causes the pump assembly 30 to stop delivering liquid fuel is the obstruction of passages 42, 42A. Other predetermined conditions may be employed within the scope of the claimed invention. For example, the predetermined condition may be the transmission of an electronic or wireless signal from the fuel pump shut-off system. In such an embodiment, the fuel tank assembly would be configured so that the transmission of the signal would be dependent upon the fuel composition and the volume of fuel in the tank chamber.

While the best modes for carrying out the invention have been described in detail, those familiar with the art to which this invention relates will recognize various alternative designs and embodiments for practicing the invention within the scope of the appended claims.

The invention claimed is:

1. A fuel tank assembly that is fillable by a fuel pump, the fuel pump having a nozzle through which the fuel pump delivers liquid fuel and being configured such that the existence of a predetermined condition causes the fuel pump to stop delivering fuel, the fuel tank assembly comprising:
a tank defining a chamber having a first maximum fill level and a second maximum fill level;
wherein the first maximum fill level is defined by a first fuel blend having an ethanol content of twenty percent (20%) or less;
wherein the second maximum fill level is defined by a second fuel blend having an ethanol content of one hundred percent (100%);
a fill tube defining an opening configured to receive the nozzle of the fuel pump and defining a first passageway that provides fluid communication between the opening and the chamber to transfer liquid fuel from the nozzle to the chamber;
a fuel pump shut-off system that is configured such that whether the predetermined condition exists when the nozzle is in the opening depends on a total volume of liquid fuel in the chamber and an ethanol content of the liquid fuel in the chamber;
wherein:
the fuel pump shut-off system is a vent system that at least partially defines a second passageway that extends from the chamber to the exterior of the tank;
the second passageway includes an inlet within the chamber;

the inlet is obstructable to prevent passage of air from the chamber through the second passageway;

a height of the inlet within the chamber is adjustably variable between the first maximum fill level of the chamber and the second maximum fill level of the chamber and adjustment of the height of the inlet is limited to a predetermined range defined by the first maximum fill level of the chamber and the second maximum fill level of the chamber;

the fuel pump shut-off system includes a sensor to sense a material property indicative of the ethanol content of the liquid fuel in the chamber and to cause adjustment of the height of the inlet to an adjusted height;

wherein the adjusted height is between the first and second heights and is defined by the ethanol content of the liquid fuel in the chamber; and wherein the predetermined condition is the inlet at the adjusted height being sufficiently obstructed to prevent the passage of air from the chamber through the second passageway.

2. The fuel tank assembly of claim 1, further comprising:
the vent system having a vent tube defining the second passageway;
the vent tube having a first end and a second end;
wherein the inlet is defined by the first end;
wherein the second end of the vent tube is connected to the fill tube such that the inlet is fluidly connected to the first passageway via the second passageway;
wherein the sensor includes a floater disposed within the chamber and connected to the vent system such that vertical movement of the floater causes vertical movement of the inlet to the adjusted height.

3. The fuel tank assembly of claim 2, wherein the density of the floater is such that the floater exhibits buoyancy in the first liquid fuel type, and does not exhibit buoyancy in the second liquid fuel type.

4. The fuel tank assembly of claim 1, wherein the material property is selected from the group consisting of dielectric constant, specific conductivity, optical refractive index, and oxygen content.

5. The fuel tank assembly of claim 1, wherein the fuel pump shut-off system is configured such that the predetermined condition is produced when the fuel pump is delivering liquid fuel to the chamber via the nozzle.

6. The fuel tank assembly of claim 1, wherein the vent system includes a vent tube that at least partially defines the second passageway and the inlet; and
wherein the fuel pump shut-off system includes a floater disposed within the chamber and operatively connected to the vent tube such that vertical movement of the floater causes vertical movement of the vent tube and the inlet relative to the tank.

7. The fuel tank assembly of claim 6, wherein the density of the floater is such that the floater exhibits buoyancy in the first liquid fuel type, and does not exhibit buoyancy in the second liquid fuel type.

8. The fuel tank assembly of claim 1, further comprising:
the vent system having a vent tube defining the second passageway;
the vent tube including a first tube portion and a second tube portion;
the first tube portion defining the inlet;
wherein the first tube portion is movable relative to the second tube portion such that adjustment of the height of the inlet is limited to the predetermined range.

9. The fuel tank assembly of claim 8, wherein the first tube portion is pivotably connected to the second tube portion to pivot the first tube portion within the predetermined range.

10. The fuel tank assembly of claim 8, wherein the first tube portion is connected to the second tube portion such that the height of the inlet is biased to one of the first height and the second height.

11. The fuel tank assembly of claim 1, further comprising:
an actuator actuable by the sensor;
wherein the actuator is actuable to move the inlet to the adjusted height.

12. The fuel tank assembly of claim 1, wherein the predetermined condition is the inlet at the adjusted height being sufficiently obstructed by liquid fuel flowing into the second passageway via the inlet to prevent the passage of air from the chamber through the second passageway.

13. A fuel tank assembly for storing liquid fuel, the fuel tank assembly comprising:
a tank defining a chamber;
wherein the chamber defines a first maximum fill level defined by a first fuel blend and a second maximum fill level defined by a second fuel blend;
wherein the first fuel blend has a density different from the second fuel blend;
a fill tube defining an opening for receiving a nozzle and defining a first passageway that provides fluid communication between the opening and the chamber;
a vent system including a vent tube defining a second passageway from the chamber to the exterior of the tank to permit air displaced by liquid fuel from the first passageway to be vented from the chamber;
a floater attached to the vent tube;
wherein:
the second passageway is obstructable such that air is prevented from venting from the chamber through the vent system;
the vent tube includes an inlet within the chamber;
the inlet is in fluid communication with the first passageway via the second passageway; and
a height of the inlet within the chamber is adjustably variable within a predetermined vertical range by vertical movement of the floater;
wherein:
the predetermined vertical range is limited by the first maximum fill level of the chamber and the second maximum fill level of the chamber;
the floater exhibits buoyancy which is variable with a chemical composition of the liquid fluid; and
adjustment of the height of the inlet is limited to adjustment within the predetermined vertical range; and
wherein the vent system is configured such that whether the second passageway is obstructed, such that air is prevented from venting from the chamber through the vent system, is dependent upon the total volume of liquid fuel in the chamber and the height of the inlet defined at least partially by the chemical composition of liquid fuel in the chamber.

14. The fuel system of claim 13, further comprising:
the vent system having a vent tube that defines the second passageway;
wherein the vent tube defines the inlet for the second passageway within the chamber; and
wherein at least a portion of the vent tube is attached to the fill tube and movable with respect to the tank such that the height of the inlet within the chamber is variable.

15. The fuel tank assembly of claim 14, wherein the floater disposed within the chamber is connected to the moveable portion of the vent tube such that vertical movement of the floater causes vertical movement of the inlet.

16. The fuel tank assembly of claim 14, further comprising a sensor configured to measure a value of a material property of the liquid fuel in the chamber;
   wherein the value of the material property is indicative of the chemical composition of the liquid fuel; and
   wherein the sensor is operatively connected to the vent tube such that the height of the inlet is dependent upon the value of the material property of the liquid fuel.

17. The fuel tank assembly of claim 16, wherein the material property is selected from the group consisting of dielectric constant, specific conductivity, optical refractive index, and oxygen content.

18. The fuel tank assembly of claim 13, wherein:
   the first fuel blend has a first ethanol content of twenty percent (20%) or less; and
   the second fuel blend has a second ethanol content of one hundred percent (100%).

19. A fuel tank assembly that is fillable by a fuel pump, the fuel pump having a nozzle through which the fuel pump delivers liquid fuel and being configured such that the existence of a predetermined condition causes the fuel pump to stop delivering fuel, the fuel tank assembly comprising:
   a tank defining a chamber having a first maximum fill level and a second maximum fill level;
   a fill tube defining an opening configured to receive the nozzle of the fuel pump and defining a first passageway that provides fluid communication between the opening and the chamber to transfer liquid fuel from the nozzle to the chamber;
   a fuel pump shut-off system that is configured such that whether the predetermined condition exists when the nozzle is in the opening depends on a total volume of liquid fuel in the chamber and a chemical composition of the liquid fuel in the chamber;
   wherein:
      the fuel pump shut-off system is a vent system that defines a second passageway that extends from the chamber to the first passageway;
      the second passageway includes an inlet within the chamber;
      the inlet is obstructable to prevent passage of air from the chamber to the first passageway via the second passageway;
      a height of the inlet within the chamber is adjustably variable between the first maximum fill level and the second maximum fill level and adjustment of the height of the inlet is limited to a predetermined range defined by the first maximum fill level and the second maximum fill level;
      the first maximum fill level is defined by a first fuel blend having a first chemical composition;
      the second maximum fill level is defined by a second fuel blend having a second chemical composition;
      the liquid fuel in the chamber is comprised of at least one of the first fuel blend and the second fuel blend;
      the fuel pump shut-off system includes a sensor to sense a material property indicative of the chemical composition of the liquid fuel in the chamber and to cause adjustment of the height of the inlet to an adjusted height;
   wherein the adjusted height is between the first and second heights and is defined by the chemical composition of the liquid fuel in the chamber; and
   wherein the predetermined condition is the inlet at the adjusted height being sufficiently obstructed by the liquid fuel in the chamber flowing through the inlet and into the second passageway to prevent the passage of air via the second passageway from the chamber to the first passageway.

20. The fuel tank assembly of claim 19, wherein the vent system further comprises:
   a tube segment defining the inlet;
   a pivot mounted inside the chamber and rotatably supporting the tube segment;
   wherein rotation of the tube segment about the pivot moves the inlet between the first maximum fill level and the second maximum fill level; and
   wherein the pivot limits rotation of the tube segment such that the movement of the inlet inside the chamber is limited to movement only between the first maximum fill level and the second maximum fill level.

* * * * *